(12) United States Patent
Emadi et al.

(10) Patent No.: US 9,489,701 B2
(45) Date of Patent: Nov. 8, 2016

(54) ADAPTIVE ENERGY MANAGEMENT SYSTEM

(71) Applicants: Ali Emadi, Burlington (CA); Shahin Sirouspour, Burlington (CA); Pawel Malysz, Hamilton (CA)

(72) Inventors: Ali Emadi, Burlington (CA); Shahin Sirouspour, Burlington (CA); Pawel Malysz, Hamilton (CA)

( * ) Notice: Subject to any disclaimer, the term of this patent is extended or adjusted under 35 U.S.C. 154(b) by 511 days.

(21) Appl. No.: 13/800,771

(22) Filed: Mar. 13, 2013

(65) Prior Publication Data

US 2014/0129040 A1 May 8, 2014

Related U.S. Application Data

(60) Provisional application No. 61/723,000, filed on Nov. 6, 2012.

(51) Int. Cl.
*G05D 17/00* (2006.01)
*G06Q 50/06* (2012.01)

(52) U.S. Cl.
CPC ............ *G06Q 50/06* (2013.01); *Y02E 40/76* (2013.01); *Y04S 10/54* (2013.01); *Y04S 10/545* (2013.01)

(58) Field of Classification Search
CPC ..... G06Q 50/06; Y04S 10/545; Y04S 10/54; Y02E 40/76
USPC .......................................................... 700/297
See application file for complete search history.

(56) References Cited

U.S. PATENT DOCUMENTS

| 7,561,977 | B2 | 7/2009 | Horst et al. | |
|---|---|---|---|---|
| 7,705,484 | B2 | 4/2010 | Horst | |
| 7,920,942 | B2 * | 4/2011 | Lasseter et al. | 700/286 |
| 8,024,073 | B2 | 9/2011 | Imes et al. | |
| 8,169,106 | B2 | 5/2012 | Lee et al. | |
| 8,706,650 | B2 * | 4/2014 | Ozog | G06Q 10/06 700/291 |
| 8,805,550 | B2 * | 8/2014 | Chemel et al. | 700/22 |
| 9,188,109 | B2 * | 11/2015 | Lazaris | F03G 6/00 |
| 2001/0005802 | A1 * | 6/2001 | Arita et al. | 700/286 |
| 2001/0025209 | A1 * | 9/2001 | Fukui et al. | 700/291 |
| 2003/0158638 | A1 * | 8/2003 | Yakes et al. | 701/22 |
| 2004/0024483 | A1 * | 2/2004 | Holcombe | 700/122 |
| 2009/0076661 | A1 * | 3/2009 | Pearson et al. | 700/291 |
| 2009/0326724 | A1 * | 12/2009 | Lasseter et al. | 700/287 |

(Continued)

OTHER PUBLICATIONS

Castro et al., "Embedded Energy Storage Systems in the Power Grid of Renewable Energy Sources Integration", ISEL—Instituto Superio de Engenharia de Lisboa,2009, 27 pages.*

(Continued)

*Primary Examiner* — Robert Fennema
*Assistant Examiner* — Thomas Stevens
(74) *Attorney, Agent, or Firm* — Brion Raffoul

(57) ABSTRACT

Systems, methods, and devices related to a microgrid system for providing power to a facility. A self-contained power system provides power to a facility using a combination of power storage elements and renewable energy sources. A connection to an external power grid may also be provided. The system optimizes power flow to the facility using power from the storage elements and the renewable energy sources and, if necessary, the external power grid. The optimization process predicts future power usage by the facility using power usage data from a predetermined time window. The optimization process can also take into account predicted energy generation amounts by the renewable energy sources. To optimize economic effects, the optimization process can also determine whether to buy and when to buy power from the external power grid.

12 Claims, 11 Drawing Sheets

(56) References Cited

U.S. PATENT DOCUMENTS

| | | | |
|---|---|---|---|
| 2010/0017045 A1* | 1/2010 | Nesler | B60L 11/1824 700/296 |
| 2010/0114395 A1* | 5/2010 | Hinatsu et al. | 700/295 |
| 2010/0138066 A1* | 6/2010 | Kong | 700/295 |
| 2011/0215640 A1* | 9/2011 | Donnelly et al. | 307/21 |
| 2011/0276192 A1* | 11/2011 | Ropp | H02J 3/383 700/293 |
| 2011/0276194 A1* | 11/2011 | Emalfarb et al. | 700/297 |
| 2012/0053739 A1 | 3/2012 | Brian et al. | |
| 2012/0072039 A1* | 3/2012 | Anderson | G05B 15/02 700/291 |
| 2012/0173035 A1* | 7/2012 | Abe | 700/297 |
| 2012/0296482 A1* | 11/2012 | Steven et al. | 700/291 |
| 2013/0041517 A1* | 2/2013 | Nelson et al. | 700/292 |
| 2013/0079943 A1* | 3/2013 | Darden et al. | 700/297 |
| 2013/0317959 A1* | 11/2013 | Joos | C25B 15/02 705/34 |
| 2014/0163755 A1* | 6/2014 | Potter | H02J 3/383 700/287 |
| 2014/0257913 A1* | 9/2014 | Ball | G01C 21/343 705/7.25 |

OTHER PUBLICATIONS

Williamson et al., "Distributed Fuel Cell Generation in Restructured Power Systems", IEEE, 2004, pp. 2079-2084.*

Kyocera, "Kyocera to Start Exclusive Sales in Japan of New Residential-Use Energy Management System Combining Solar Power with Li-ion Battery Storage Unit", Kyocera Corporation News Releases, Jan. 2012, 4 pages.

* cited by examiner

| h | 0.5 | 0.5 | 0.5 | 0.5 | 0.5 | 0.5 | 0.5 | 1 | 1 | 1 | 1.5 | 1.5 | 1.5 | 1.5 |
|---|---|---|---|---|---|---|---|---|---|---|---|---|---|---|
| $\delta_r$ | 0 | 0 | 0 | 1 | 1 | 1 | 1 | 0 | 0 | 0 | 1 | 0 | 0 | 1 |
| $\Delta\delta_r$ |  | 0 | 0 | 1 | 0 | 0 | 0 | -1 | 0 | 0 | 1 | -1 | 0 | 1 |
| $-\Delta\delta_r$ |  | 0 | 0 | -1 | 0 | 0 | 0 | 1 | 0 | 0 | -1 | 1 | 0 | -1 |
| $1-\delta_r$ | 1 | 1 | 1 | 0 | 0 | 0 | 0 | 1 | 1 | 1 | 0 | 1 | 1 | 0 |

Past time-steps

ADAPTIVE ENERGY MANAGEMENT SYSTEM

TECHNICAL FIELD

The present invention relates to energy management. More specifically, the present invention relates to systems, methods, and devices for providing an optimized power flow to and from a facility whose power needs are met by a collection of renewable energy sources, energy storage elements, and a potential link to an external power grid.

BACKGROUND OF THE INVENTION

The potential energy crisis due to disappearing fossil fuel sources and the pollution caused by these traditional fossil fuels is well-known. Awareness of this issue and a growing willingness among the populace to work towards alleviating the effects of the looming shortage of fossil fuels and its pollution has given rise to the increasing use of so-called "green" or environmentally friendly technologies, including technologies that relate to renewable energy sources.

This growing trend of using consumer-accessible green energy technology, such as solar/wind power, electrified vehicles, and on-site electricity storage enables the greater population to participate in the energy markets, utilize smart-grid technology, and improve their energy efficiency. These trends can generate economic, environmental, and societal benefits via reduced reliance on traditional high pollution producing fossil fuels, a more open competitive and democratized energy market, and reduced costs for industry and consumers.

However, currently there are no systems which integrate the different available environmentally friendly energy and power technologies in a coherent and holistic fashion so as to provide the consumer or the user with the potential benefits of such technologies. Ideally, such systems would manage the various technologies so that energy use and energy sourcing can be optimized using different criteria.

There is therefore a need for such systems and for methods which complement and enhance such systems.

SUMMARY OF INVENTION

The present invention provides systems, methods, and devices related to a microgrid system for providing power to a facility. A self-contained power system provides power to a facility using a combination of power storage elements and renewable energy sources. A connection to an external power grid may also be provided. The system optimizes power flow to the facility using power from the storage elements and the renewable energy sources and, if necessary, the external power grid. The optimization process predicts future power usage by the facility using power usage data from a predetermined time window. The optimization process can also take into account predicted energy generation amounts by the renewable energy sources. To optimize economic effects, the optimization process can also determine whether to buy and when to buy power from the external power grid. Similarly, the optimization process can also determine if and when power can be sold and sent to the external power grid.

In a first aspect, the present invention provides a system for controlling power flow to a facility, the system comprising:
- a controller for controlling power flow to said facility and for controlling elements of said system;
- a power bus for coupling elements of said system to said controller and to one another;
- at least one energy storage unit element for storing energy, said at least one energy storage unit element being coupled to said power bus;
- at least one power source element for generating power, said at least one power source element being coupled to said power bus;
- at least one power load located at said facility, said at least one power load being controlled by said controller;

wherein
said controller controls said power flow to said facility based on at least one of:
- weather data;
- geographical data;
- occupancy data;
- historical data for power consumption of said facility;
- operating conditions of said system;
- predicted power demands of said system; and
- user entered preferences.

In a second aspect, the present invention provides a method for optimizing operations at a system which controls power flow to a facility, the method comprising:
a) gathering power usage data by said system over a predetermined period of time immediately preceding a set point in time;
b) predicting power usage by said system for a predetermined future period of time based on said power usage data, said predetermined future period of time being immediately succeeding set point in time;
c) predicting an amount of power generated by renewable energy sources in said system for said predetermined future period of time;
d) determining a net demand for power for said system based on said power usage predicted in step b) and said amount of power predicted in step c);
e) determining whether to draw power from energy storage unit elements in said system for said future period of time based on said net demand for power for said system;
f) determining whether to draw power from an external power grid for said future period of time based on said net demand for power for said system, said external power grid being coupled to said system.

BRIEF DESCRIPTION OF THE DRAWINGS

The embodiments of the present invention will now be described by reference to the following figures, in which identical reference numerals in different figures indicate identical elements and in which.

DETAILED DESCRIPTION OF THE INVENTION

Figure 1:
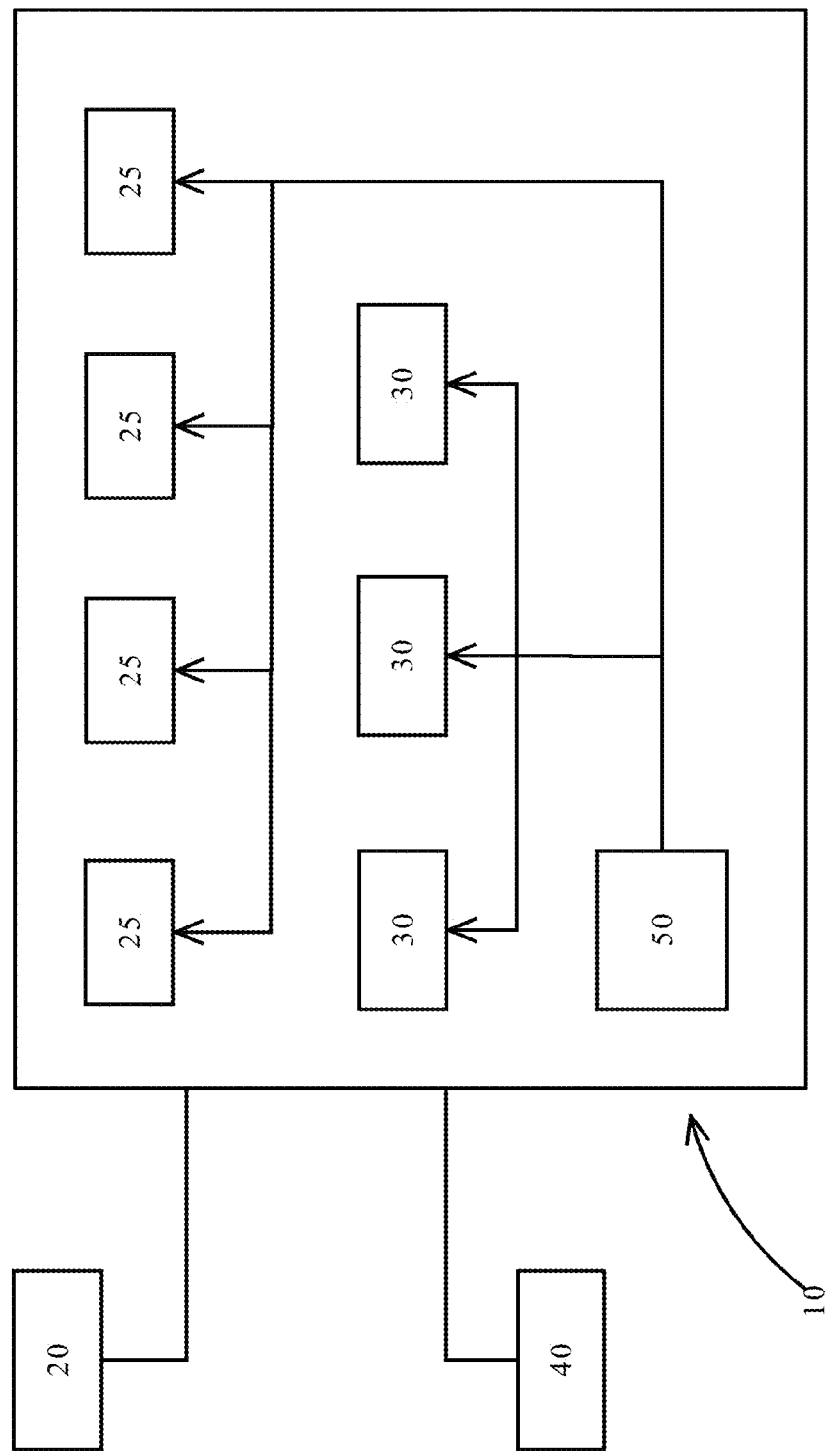
FIG. 1 is a block diagram of an energy management system according to one aspect of the invention.

Referring to FIG. 1, a block diagram of one aspect of the invention is illustrated. A power system 10 supplies and manages a power flow to a facility 20. As part of the system 10, renewable energy sources 25 generate power when required. Energy storage elements 30 are also part of the system 10. The energy storage elements 30 store power from different sources so that it may be used when needed by the system. An external power grid 40 can also be coupled to the system 10. As will be described below, the external power grid can be disconnected but this grid can be called upon to provide power if necessary. A controller 50 controls the power flow within the system 10 and determines where power is to be taken from and where it is to be routed. As will be described below, an optimization process is executed on the controller 50 and this process determines the various power flows within the system 10. In one embodiment, the controller 50 not only controls the various energy sources and the routing of power within the system, it also controls at least some of the loads consuming power in the facility. This way, if possible, the controller can reschedule when these loads draw power from the system.

Figure 2:
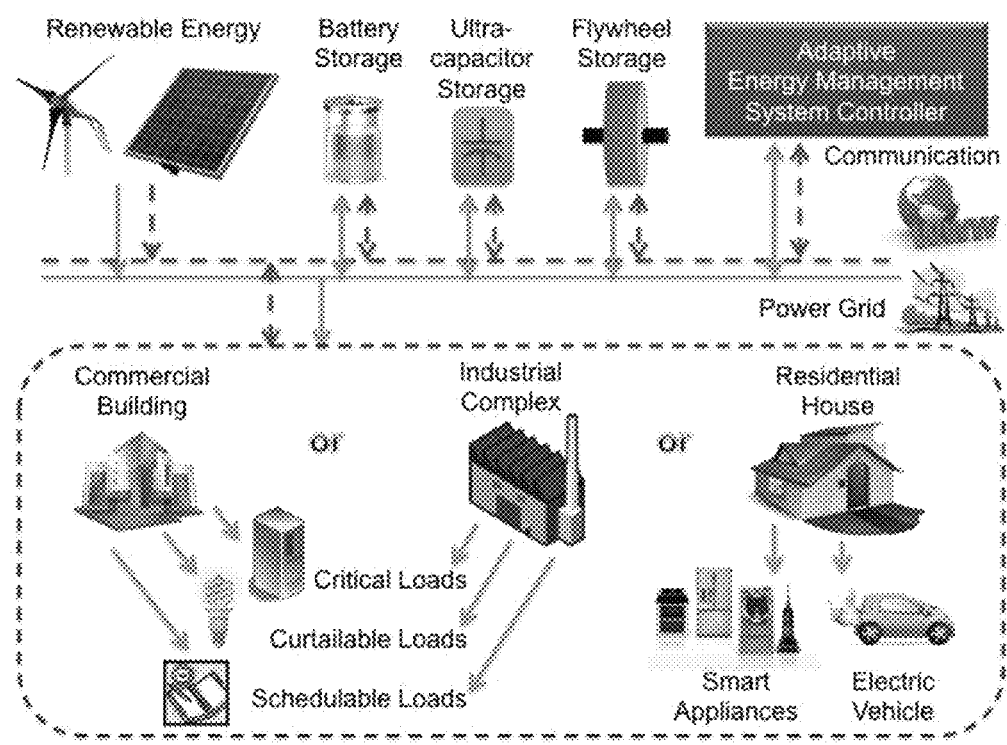
FIG. 2 is a schematic version of the block diagram of the system in FIG. 1 illustrating the various parts and potential embodiments in more detail.

This aspect of the invention, an Adaptive Energy Management System (A-EMS), can be conceptually viewed with the system model depicted in FIG. 2. A microgrid representing either an industrial, commercial, or residential building/complex is connected with on-site electricity storage elements, renewable energy devices, controllable loads, and connections with an external power grid and communication networks. The A-EMS can control the power dispatch in the microgrid system and can do so using external information such as weather forecasts and market electricity prices. The goals of the A-EMS are multi-faceted, ranging from economic benefits for consumers, grid reliability power profile shaping for utilities, extending battery/storage life, to providing emergency backup power during islanded mode.

The energy management system can include any of the following energy storage elements:
  Battery Storage: On-site DC battery storage element(s) that can be either Sealed Lead Acid (SLA) based, NiMH based, or Lithium ion/polymer based.
  Ultra-capictor(s): A high power density DC storage element that can be used to augment power rates within the microgrid.
  Flywheel(s): A mechanical spinning disk based storage element; it can have long cycle life and reduce wear on other storage elements. A DC power port exists for this element.

The energy management system also incorporates Renewable Energy Sources (RES). These sources may be one or more of the following:
  Solar Power Panel(s): An array of Photo-Voltaic (PV) cells/panels used to generate DC current/voltage.
  Wind-power turbine(s): A generator turbine that produces time-varying DC current/voltage The energy management system can use one or both of two functionally different networks:
  Communication Bus network: A communication network used to communicate information and/or control commands between different elements within the microgrid and with external networks such as the Internet and/or electric utilities. The communication bus can employ standard protocol such as wireless/wired Ethernet, industrial CAN-Bus, Zig-Bee, and other industrial protocols.
  Power Bus network: An electricity power bus used to transfer power flow between different elements in the microgrid and with the external grid. This bus can contain both AC and DC circuit topologies. One end is connected to the external power grid and is capable of disconnecting the A-EMS and its microgrid such that it can function in islanded-mode.

The energy management system can connect to either or both of the following systems:
  External Power Grid: The greater AC power grid in a neighborhood/city/province.
  External Communication network: Information flow networks such as the Internet, grid utility companies, and other microgrids.

The energy management system may also include any of the following devices/subsystems:
  Electrified Vehicle(s): This can be a single PHEV (plug-in hybrid electric vehicle) or multiple PHEVs. The electric storage (on-board battery) of the vehicle(s) can be used to augment the microgrid storage capacity. The discharging/charging of the vehicles can be scheduled by the A-EMS.
  Curtailable Microgrid AC Loads: Comprising of typical AC curtailable loads found in residential, industrial, and/or commercial settings. These can be shed to conserve power in events such as islanding mode to maximize the duration of emergency back-up power. Example loads can include non-essential lighting, office equipment, appliances and electronics. The default (non-curtailment) setting for these loads is that they are always on once physically connected to the A-EMS.
  Schedulable Microgrid AC Loads: Comprising of typical AC schedulable loads found in residential, industrial, and/or commercial settings. These can be controlled by the A-EMS in terms of when and how much power they consume. Examples include: smart appliances such as washing machine, dryer, air-conditioning unit, dishwasher, schedulable factory machinery, and existing AC based PHEV charging stations.
  Critical Microgrid AC Loads: Comprising of typical AC critical loads found in residential, industrial, and/or commercial settings. These loads function to always remain on provided sufficient power is available from local energy storage and local power generation. These loads have priority. Examples include: computer servers and emergency lighting.
  Graphical User Interfaces: Running on one or more of the following devices: a built-in display on the host embedded computer, network connected smartphones, tablet computers, laptop computers, or desktop computers.

The system includes the A-EMS controller, which performs a number of functions as detailed below.

The controller collects data from external and internal source of information. The data can include user-specified commands/preferences, weather-related information including past and forecast/predicted for the specific geographical location of the microgrid, status of smart appliances, power meter readings, temperature measurements, battery charger status, and any other available sensory information in the micro-grid.

The controller also processes the collected information and system historical data in order to predict critical information for the operation of the microgrid. In particular, it predicts the electricity demand of the microgrid, renewable energy production capacity, and the connection and disconnection times of electric vehicles (EVs) or plug-in hybrid electric vehicles (PHEVs), EVs/PHEVs charge levels, all within a finite time horizon, e.g. 24 hours.

The controller also uses the prediction data, cost of electricity data, information on operational costs of the microgrid elements, user preferences and other data in order to make "optimal" decisions with respect to the operation of the micro-grid. These include charging and discharging of the energy storage elements, utilization of renewable energy sources, scheduling of EV/PHEV charging, operation of heating and AC systems, and operation of smart appliances. Optimality is measured with respect to a set of user-defined objectives that can include the overall cost of electricity for the user, peak shaving, load shifting, power factor correction, geographical data, occupancy data, voltage/frequency regulation, spinning/non-spinning reserves, usage costs of on-site storage, PHEV charging, and scheduling constraints of electric AC loads. The controller makes the power dispatch and load scheduling decisions at a specified time-step (e.g. 5 min to 1 h) by formulating and solving a mixed-integer linear programming (MILP) problem. The MILP problem is explained in more detail below. The controller transmits the computed optimal operational commands to the micro-grid elements through its wired and/or wireless communication links. The process carried out by the controller to optimize the working of the system is described in more detail below.

The controller also provides the user with feedback of real-time and historical information about the system operation via its GUIs (graphical user interfaces) described above. It also give the user the opportunity to customize and enhance the decision making process by specifying priorities and providing information on major electricity usages in future times. Based on the user entered preferences, the controller can better optimize the workings of the system in-line with the user specified priorities.

The controller is also responsible for coordinating transitions between grid-connected mode and islanded mode to ensure an uninterrupted supply of power for the microgrid. In islanded mode, the microgrid is isolated from the external power source and subsists only on the power generated within the microgrid (from the renewable energy sources) or power that has been stored within the microgrid (from the power storage elements within the system).

Figure 3:
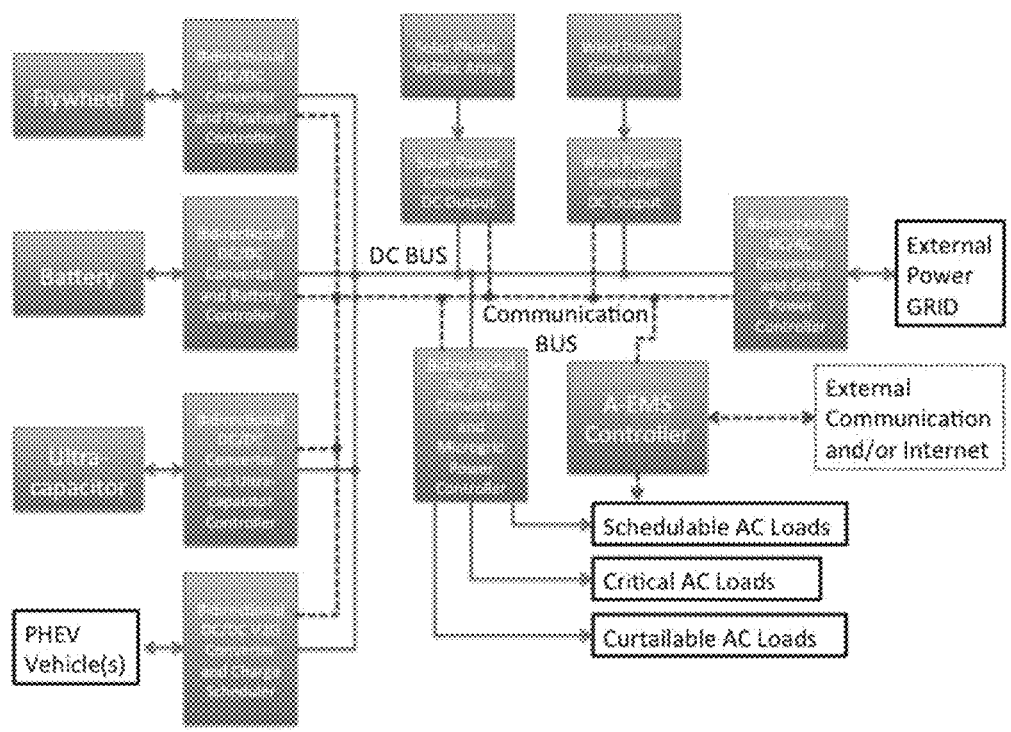
FIG. 3 is a network block diagram of the system in FIGS. 1 and 2 detailing the interconnections for a network using a DC bus.
Figure 4:
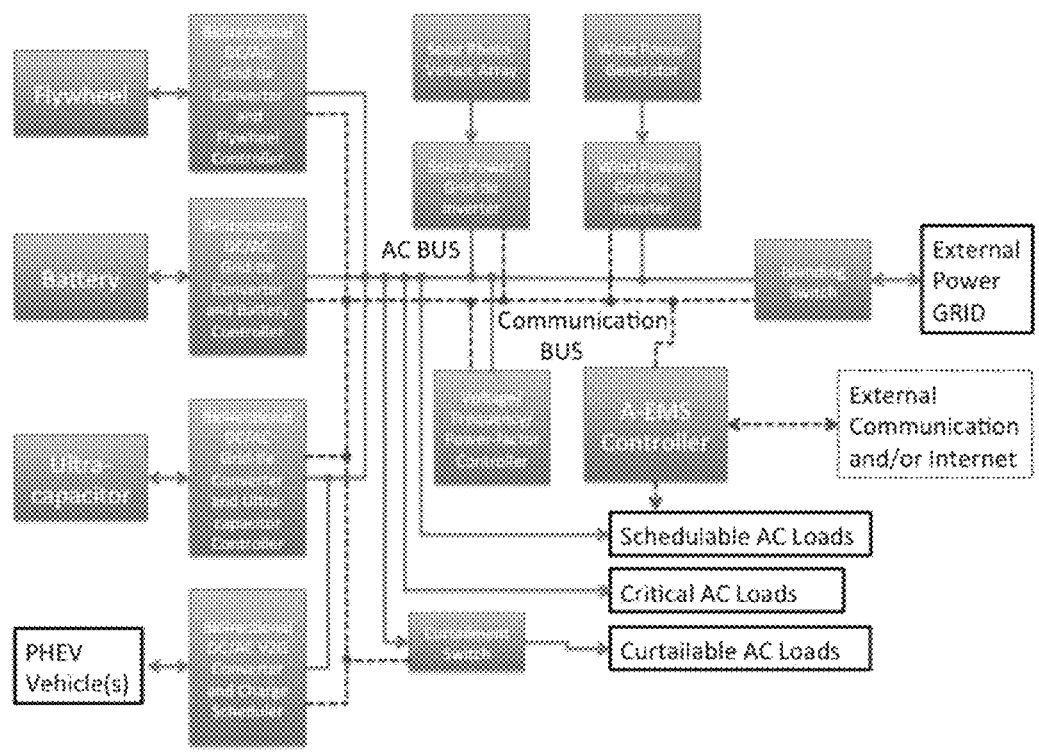
FIG. 4 is a network block diagram of the system in FIGS. 1 and 2 detailing the interconnections for a network using an AC bus.

Two possible topologies for the microgrid system are depicted in FIG. 3 and FIG. 4 where the blue shaded boxes indicate components part of the A-EMS system. White boxes indicate external connections to the A-EMS while solid lines indicate electricity power flow wiring. Dashed lines indicate a communication bus for the system.

The topology in FIG. 3 uses a common DC bus to separate the external AC power grid from the AC loads and the PHEV. This topology simplifies the design and complexity of the DC/DC bidirectional converters and DC-output controllers that interconnect the storage elements (e.g. the flywheel, battery, or ultra-capacitor), the renewable energy sources (e.g. solar energy source, wind energy source), and the PHEV charger to the microgrid system. The DC/DC bidirectional converters control the charging/discharging of the different storage elements onto the common DC bus. The solar/wind power controllers provide maximum output power from the renewable energy sources and can be disconnected from the DC bus. The bidirectional DC/AC converter that connects with the external grid facilitates services such as power factor correction and voltage/frequency regulation to the grid when deemed appropriate by the A-EMS controller. It also has the capability to disconnect itself from the external grid and enter islanded mode. The other bidirectional DC/AC converter contains a microgrid power controller for frequency/voltage regulation for the AC-based loads in the microgrid.

The topology in FIG. 4 employs an AC bus. The advantage of this topology is the plug-and-play capability of the different components of the system onto an existing electrified AC bus/grid. Bidirectional DC/AC converters enable power flow between the different storage elements and the AC bus. Solar/Wind power grid-tie inverters provide maximum power to the AC bus when their operational mode is enabled. In disabled mode the solar/wind power grid-tie inverters are disconnected from the AC bus. An islanding switch, such as a controllable relay, can be used to disconnect from the external power grid. When in islanded mode, a power-factor, voltage/frequency controller is utilized to maintain islanded AC microgrid power quality. In the grid-connected mode, this component can provide these services to the external grid. A controllable curtailment switch (e.g. a relay) can shed non-essential loads.

As can be seen from FIG. 4, the power-factor and voltage/frequency controllers are separate controllers from the main A-EMS controller. The power-factor and voltage/frequency controllers are designed to perform the tasks of voltage/frequency control and power factor correction using power electronics. For the AC-bus topology in FIG. 4, the main A-EMS controller enables these controllers whenever islanded mode is detected. The main A-EMS controller disables these same controllers whenever grid-connected mode is re-established. For the power-factor controller, the main A-EMS can give it desired commands as to how much of a power-factor correction to perform. The main A-EMS controller will give different commands to these other controllers depending on whether grid-connected mode or islanded-mode is detected. The main A-EMS controller has mostly low-power interfaces that are used for communicating to different devices in the microgrid.

The A-EMS controller in both topologies can take the form of software being run from a desktop computer, a laptop, a DSP (digital signal processing) board, a microcontroller, an FPGA-based hardware, or any other embedded computing platform.

Embodiments of the system may include a microgrid covering a neighborhood and/or commercial/industrial complex, where multiple buildings/homes embody the AC loads.

Other renewable energy sources may include facilities and devices which use hydro-electric, biomass, and geothermal energy. These facilities and device can replace solar/wind generators described above.

It should be noted that while the above description only describes two different topologies, other frequency electrified bus topologies functionally similar to the DC bus topology above are also possible. As an example, a topology using high-frequency AC can be employed.

Described below is one possible control process for this system. Other control processes are, of course, possible.

Figure 5:
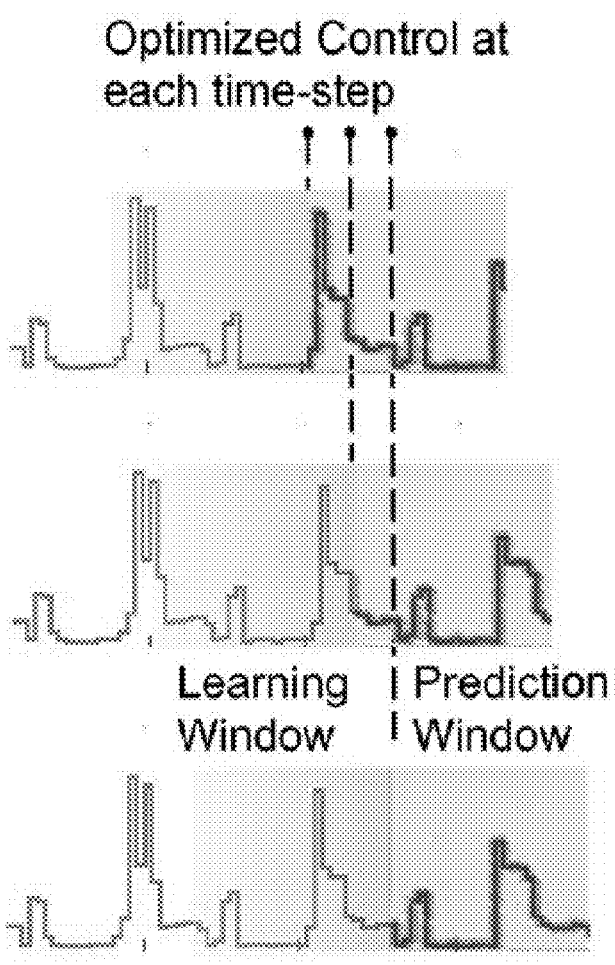
FIG. 5 is series of waveforms illustrating the sliding window technique used for predicting future power demand by the system in FIG. 1.
Figure 6:
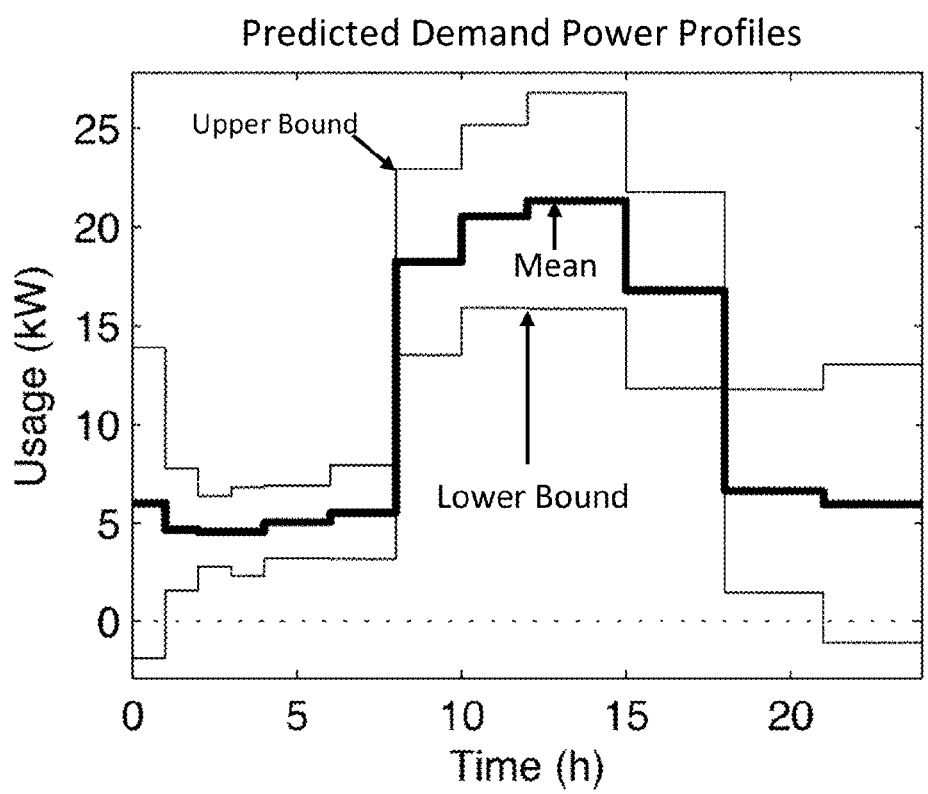
FIG. 6 illustrates a number of waveforms to show power demand profiles for the system in FIG. 1.

One potential control process for the above described system uses the rolling horizon control methodology depicted in FIG. 5. The rolling horizon control methodology uses, at every iteration, a prediction window that provides a net electricity demand forecast. This forecast is used as an input to the control process. The net demand is the difference in real power generated from the onsite renewable energy source (RES) and the electricity demand needed for loads in the building or buildings covered by the microgrid. One feature of the control process is that it can accept the forecasted net demand profile in discretized variable time-step lengths and with upper and lower bounds as depicted in FIG. 6. The use of variable time steps can reduce the total number of discretized steps and thereby reduce computational processing in the embodiment of choice. Moreover, using larger time-step lengths for forecasts that look further in the future can result in more accurate forecasts due to the need for less precision in the time scale. Accepting upper and lower bounds on the predicted net demand profile provides robustness to prediction error and inaccuracies.

Figure 7:
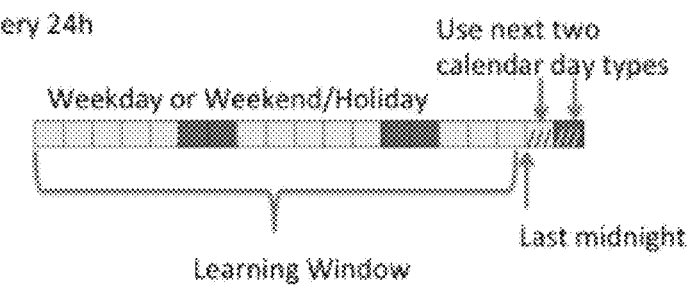
FIG. 7 has two conceptual diagrams illustrating the clustering approach used in one embodiment of the invention.
Figure 7:
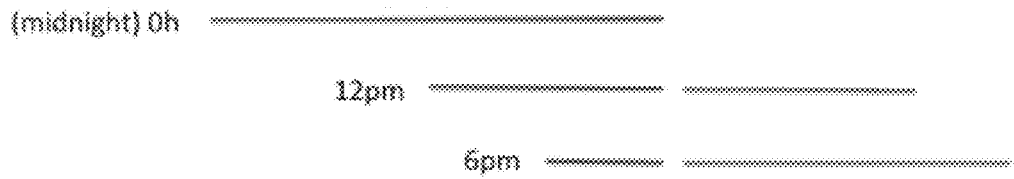

The forecasted net demand profiles can be generated from any prediction algorithm. A simple manual clustering approach depicted in FIG. 7 is described here and considers a prediction window of 24 h. A past learning window is used to determine a pattern for the demand profile. The learning window has a configurable or adjustable duration of typically one week to one month. Each day covered in the learning window is classified according to its day type, e.g. weekday or holiday. This classification, otherwise known as a clustering process, is performed once a day at midnight. The general idea is to average the last number of similar day types to predict future days, e.g. average last 5 weekday/ weekend days. To obtain hourly rolling window predictions, data from two predicted days is needed with the portion of which days to use is based on the time of day. For clarity, as can be seen from the lower part of FIG. 8 a greater portion of the second day ahead is used for later hours in the day. To predict the conditions for the earlier hours of the day, a greater portion of the first day is used. This process can be easily modified to address longer prediction windows, e.g. for hourly future predictions for up to 48 hours in the future, at each midnight a forecast for 3 days into the future is made. For clarity, it should be noted that 24+48=96 h=3 days. A similar process can also be used to classify solar power production. The main difference between solar power production predictions and power consumption predictions is that, instead of classifying days based on whether a day is a weekday or a weekend, days are classified based on what are the prevailing weather condition on a particular day. As an example, days are classified based on weather data, e.g. cloudy day, partially cloudy day, sunny day, etc. Historical weather data and forecasts are readily available online from the Internet and can easily be accessed by the controller. The net demand profile will be the sum of the demand prediction (electricity power needed for the house/building) and the prediction for renewable energy production. To find upper/ lower bounds on predictions, a plus/minus error term is used. The error term is the standard deviation from the number of past averaging days.

Figure 8:
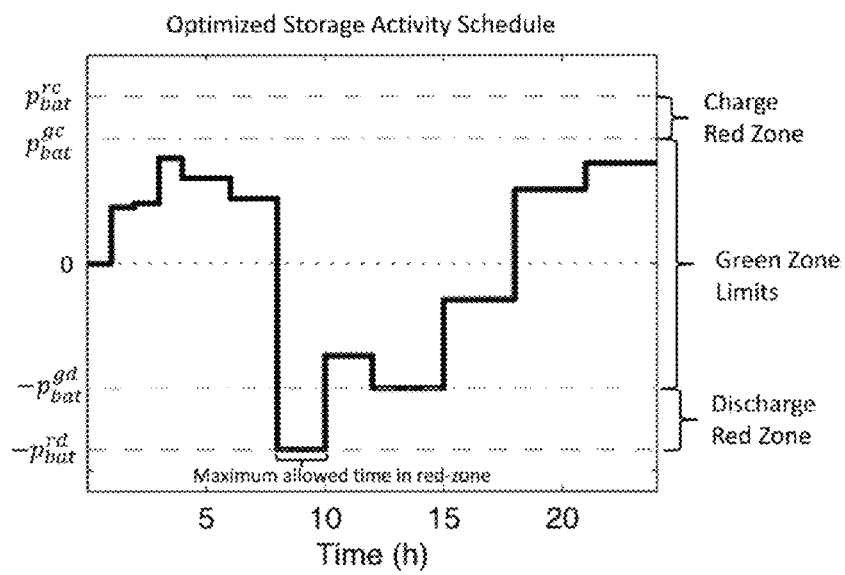
FIG. 8 is a waveform illustrating a battery use profile with green and red zones.

The control process generates a Mixed Integer Linear Program (MILP) to be solved by a subprocess within the method dedicated to solving MILP formulations. Multiple objectives of the MILP based controller have optimization costs associated with them. The different costs include: buying/selling electricity, peak demand, battery usage, battery power signal smoothing, grid connection signal smoothing/flattening. The trade-off between these multiple costs/ goals can be adjusted by system users. Both physical constraints and user-imposed constraints are incorporated into the controller. These include a discretized battery model, power/energy limits, robustness control constraints, and grid signal shaping constraints. The incremental red-zone battery power charge/discharge rates are managed by the controller to allow the use of temporarily high power rates at optimal times. The optimization MILP solver subprocess generates a battery usage power profile, an example of which is depicted in FIG. 8. It is noted the red zone power rates are between the dashed green and dashed red horizontal lines, it is also noted the time-scale steps match with the variable time-steps given by the demand prediction profile used to generate FIG. 6. The red-zone rates are the rates over and above the normal operating regions. The red-zone rates provide the system with extra capacity which may be called upon for short periods of time. The full details of the MILP mathematical formulation are given below.

Figure 9:
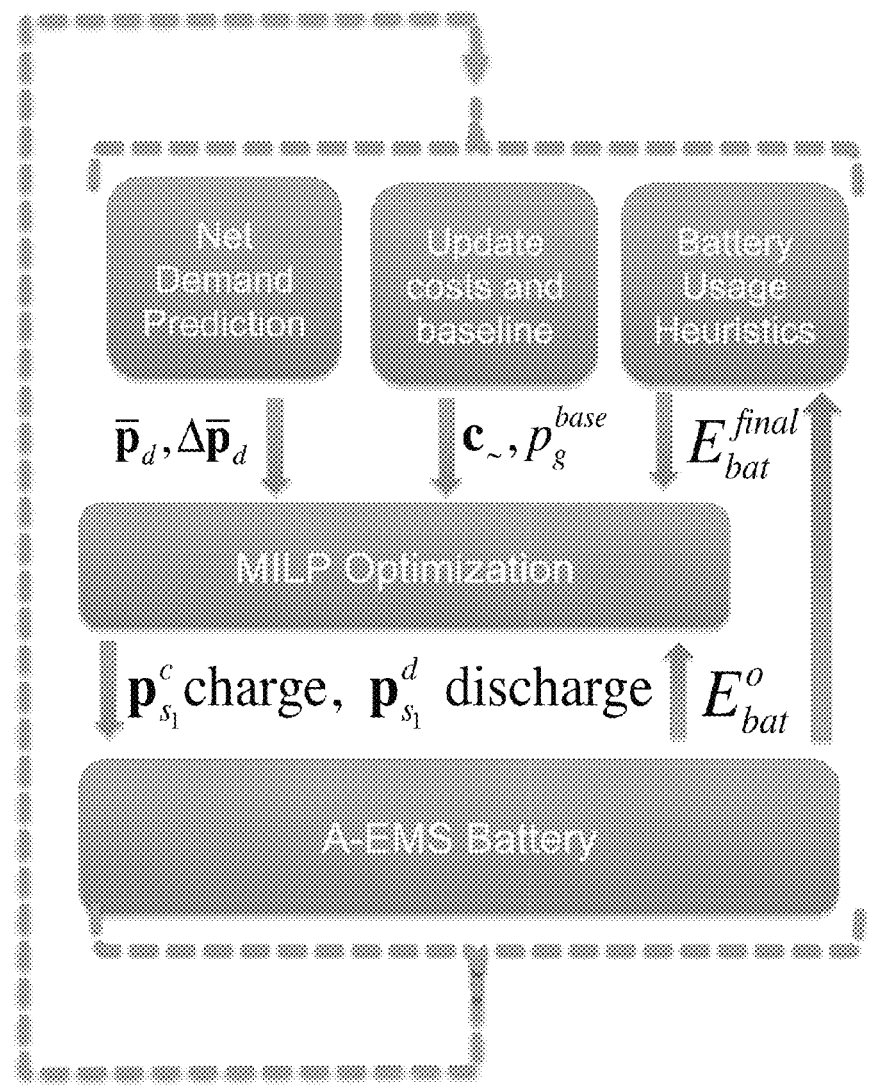
FIG. 9 is a block diagram of the process inputs for the optimization of the system in FIG. 1.

Although a control profile of battery charging/discharging is generated at each iteration of the control process, only the first/current element of the profile is used for controlling battery charging/discharging power. The overall control process is depicted in FIG. 9. Other inputs to the process may include measurements of the actual battery level, a target final battery level at the end of the rolling horizon, and an updated running peak usage term. This latter term keeps track of the peak electricity usage with a billing cycle. This term may be necessary since the rolling horizon is almost always shorter in duration than a billing cycle. The control process is adaptive as it can use updated net demand forecasts and allows system users to adjust goals/optimization-costs on the fly. The adaptability results from the use of the optimization solver that optimizes the process based on the various inputs at every time-step. The length or duration of each time-step can be specified by the user.

The control process can be implemented in software on a computer/laptop and/or on an embedded programmable device. The process can be executed by the computer or laptopor it can be run as a combination of a computer with an embedded programmable device. An example combination of computer and embedded device can be a dedicated MILP solver on an embedded device connected to a computer which runs the rest of the control process.

It should be noted the A-EMS controller communicates with a battery controller to dictate charge/discharge rates and to receive measurements of battery energy level. The charge/ discharge rates are, in one implementation, based on the optimization process outlined above.

The energy management system communicates with external networks to update parameters in the control process. This communications can be through Ethernet, WiFi, cellular networks, or other standard communication protocols. An example implementation can include a user interface app/program operating with a touch-screen based tablet/smart-phone.

In one implementation of the invention, an AEMS control algorithm employs a rolling prediction horizon or window at each time step. This is conceptually depicted in FIG. 5. It is assumed a prediction algorithm generates an estimated net demand power vector $\bar{p}_d$ along with a bounded uncertainty error estimate $\Delta\bar{p}_d$ for each future time step in the horizon. Typically such a prediction algorithm would employ past information or a learning window of past data to generate estimates of net demand and its uncertainty.

A MILP optimization problem is solved at each time step and the optimized variables corresponding to the current time-step are used for controlling the battery charge and discharge power rates. The optimized algorithm assumes the following discrete-time battery model $$E_{k+1} = E_k + \eta_c h_k p_{bat_k}^c - \eta_d^{-1} h_k p_{bat_k}^d - E_{bat}^{loss} h_k \quad (1)$$

where $E_k$ is the energy in the battery at time-step k typically measured in kWh, $h_k$ is the length of each time-step in the prediction horizon measured in hours, $E_{bat}^{loss}$ is a self discharge loss expressed as kWh per hour, $p_{bat_k}^c$ and $p_{bat_k}^d$ battery charging and discharging power rates, $\eta_c$ and $\eta_d$ are charging and discharging efficiencies respectively. The frequency at which the Rolling Horizon controller operates is dictated by $h_1$, i.e. the first element of horizon time-step duration vector h. Note that since battery charging/discharging are mutually exclusive events the vector property $(p_{bat}^c)^T p_{bat}^d = 0$ must hold.

It may be desired to employ a battery usage cost in the optimization to avoid unnecessary battery activity that would otherwise reduce battery life. This usage cost can be expressed in units of ¢/kWh. One way to estimate this cost is by assuming half-life behaviour such that the capacity of the battery drops by some multiplicative factor after each charging cycle. Let this be denoted as Capacity Factor Per Discharge (CFPD) where CFPD<1. The total number of charging cycles can then be estimated via the sum of geometric series formula CFPD/(1−CFPD). If we consider a battery rated for approximately 2700 charging cycles before capacity drops to 80% of its initial value, we arrive at CFPD=0.99991735 and maximum number of cycles becomes 12099. Assuming an upfront battery cost of $300 per kWh translates to a usage cost of 2.5¢/kWh. More sophisticated approaches to estimate and adjust/update the usage cost over time can also be implemented.

There is some flexibility in choosing the final battery energy level at the end of the rolling horizon window, such choices tend to be based on some heuristic decisions. Not having any condition or constraint as to the end of horizon battery energy level would in many cases result in an optimized profile that would completely drain the battery. The reason is that from the optimization algorithm's point of view any initial stored energy would be considered "free" energy and completely used. One choice that may be amenable to steady state conditions is to determine that the battery energy levels at the start and end of the rolling horizon be equal, i.e. $E_{bat}^{final} = E_{bat}^o$. Alternatively an initial optimization can be first performed to determine $E_{bat}^{final}$. This can be done, for example, by assuming $E_{bat}^{final} = E_{bat}^{final} = E_{bat}^o$ and adding $E*_{bat}$ to the optimization algorithm. The second normal optimization can then be performed with the choice $E_{bat}^{final} = E*_{bat}$. The goal of this optimized $E_{bat}^{final}$ approach is that it would, in the long run, cause the battery energy level to fluctuate around some optimal level.

A significant portion of electricity costs for large commercial and industrial consumers result from peak usage demand costs during a billing cycle, for example the peak average power measured over any 15 min interval during a month. It would be desirable to minimize these costs over the time frame of the billing cycle. However since the rolling horizon window would typically be chosen in the range of hours to a few days, constantly minimizing as much as possible the peak usage over all these windows may be unnecessary and potentially degrade performance. Instead it is better to keep track of a running peak usage, i.e. $p_g^{base}$, and penalize usage above this baseline for subsequent rolling horizons in the same billing cycle. At the start of the billing cycle the baseline is reset to $p_g^{base}=0$, and this baseline is raised only if necessary.

Although the optimization provides a profile or schedule of battery power activity, only the first element is implemented at each iteration of the rolling horizon controller. As a result a significant reduction in optimization computational costs can be gained by relaxing the integer constraints to all but the first (few) time step(s). A reduction in performance would be expected. Finally, a block diagram summarizing the Rolling Horizon controller is shown in FIG. 9.

The following presents a non robust optimization problem for the case where net demand can be perfectly predicted, i.e. $\bar{p}_d = p_d$. Prior to describing the formulation, a preliminary linear program and the standard form MILP is first presented. This is followed by the MILP formulation to be used with the Rolling Horizon controller. An alternative MILP formulation is also presented below.

A simple linear program can be formulated by considering only time of use usage costs, i.e.

$$\min_{p_s} c^T p_g = \min_{p_s} c^T (p_d + p_s) \Rightarrow \min_{p_s} c^T p_s \quad (2)$$

where $c = c_{buy} = c_{sell}$ is time of use electricity costs, $p_d$ is the electrical demand usage vector, $p_s$ is battery power storage activity, and $p_g$ the net flow with the external grid. Battery charging occurs when $p_{s_k} > 0$ and discharging when $p_{s_k} < 0$. Since only one vector $p_s$ is used for battery power activity this requires the same charging and discharging efficiencies $\eta = \eta_c = \eta_d$ in order to derive constraints representing battery energy limits in standard LP form. To handle different buy/selling prices and different charging/discharging efficiencies a MILP formulation is needed and such is described below. Finally, it should be noted the term $c^T p_d$ in (2) is constant. A counterpart optimization problem that yields an identical optimized battery storage profile $p_s$ can be obtained by dropping the term $c^T p_d$ as seen in (2). This same simplification is also used in subsequent MILP formulations.

The standard form for a MILP (Mixed Integer Linear Program) typically used for many solvers is given as $$\min_{x,\delta} c_x^T x + c_\delta^T \delta \quad (3)$$

$$[A_x A_\delta][x^T \delta^T]^T \leq b \quad (4)$$

$$[E_x E_\delta][x^T \delta^T]^T = f \quad (5)$$

$$x_{lb} \leq x \leq x_{ub} \quad (6)$$

$$\delta_{lb} \leq \delta \leq \delta_{ub} \quad (7)$$

where $x \in \Re$ and $\delta \in \mathbb{Z}$. Equality constraints are shown in (5), inequality constraints are given in (4), (6) and (7); the latter two represent lower and upper bounds that can also be put into the form (4). In many circumstances the integer variables may only need to be binary, in which case $\delta_{lb}=0$ and $\delta_{ub}=1$ in (7).

The non robust MILP formulation is presented below. The cost function is first presented, followed by the constraints on the optimization variables; these variables are listed in the glossary provided below. A multi-objective optimization cost function is formulated as follows $$\min \begin{pmatrix} c_{sell}^T p_s^{cs} + c_{buy}^T p_s^{cb} - c_{buy}^T p_s^{db} - c_{sell}^T p_s^{ds} + \\ c_{bat}^T (p_{bat}^{gc} + p_{bat}^{rc} + p_{bat}^{gd} + p_{bat}^{rd}) + c_{smb}^T u_b + \\ c_{smb}^T u_g + c_{peak} p_g^{ob} + c_{flat}(p_g^{max} - p_g^{min}) \end{pmatrix} \quad \begin{matrix}(8a)\\(8b)\\(8c)\end{matrix}$$

Figures 9A, 9B:
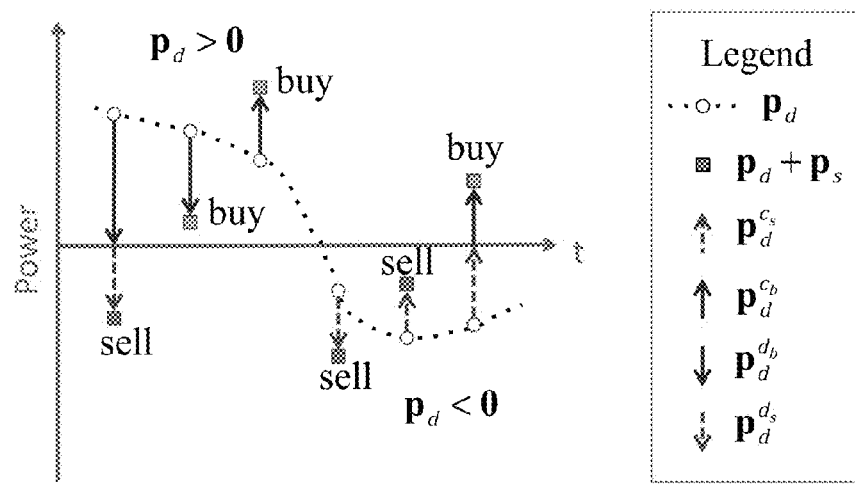
FIG. 9A illustrate different possible cases of storage activity vectors.
FIG. 9B shows battery red zone power rates maximum-on-time/minimum-off-time constraints.

Note that the indicators 8a, 8b, and 8c are not part of the optimization cost function. The sum of terms in (8a) represent the net electricity usage cost where $p_s^{cs}$ is the portion of battery charging power to offset any negative net demand grid selling, $p_s^{cb}$ is the portion of battery charging power which is bought from the grid, $p_s^{db}$ is battery discharging power to offset any positive net demand grid buying, and $p_s^{ds}$ is the portion of battery discharging power which is sold to the grid. The different possible cases of these storage activity vectors are illustrated in FIG. 9A where up arrows indicate battery charging and down arrows indicate battery discharging. The term $c_{bs}^T p_d$ is the usage cost assuming zero battery activity such that $c_{bs_k} = c_{buy_k}$ when $p_{d_k} > 0$ and $c_{bs_k} = c_{sell_k}$ when $p_{d_k} \leq 0$. Since this cost term is not effected by the optimization variables it can be neglect via identical arguments as those in (2), therefore the remaining terms in (8a) represent electricity usage cost-savings/extra-profit. Note that since the vectors are express in units corresponding to power, the elements of the cost vectors $c_{but}$ and $c_{sell}$ have to be consistent with the variable time-step length vector h. The same applies to the other cost vectors.

The terms in (8b) represent battery usage costs and a battery signal smoothing term. The battery is modelled such that there exist so-called green zone power limits that the battery power rates can always lie between. The vectors $p_{bat}^{gc}$ and $p_{bat}^{gd}$ therefore represent the green zone power rates for charging and discharging, respectively. The battery power rate can be temporarily increased via so-called incremental red zone power rates denoted by vectors $p_{bat}^{rc}$ and $p_{bat}^{rd}$ for charging and discharging, respectively. These vectors are related to the buying/selling storage power vectors via the equality constraints $$p_s^{cs} + p_s^{cb} = p_{bat}^{gc} + p_{bat}^{rc} \quad (9)$$

$$p_s^{db} + p_s^{ds} = p_{bat}^{gd} + p_{bat}^{rd} \quad (10)$$

The use of the above equality constraints allows the possibility of easily adding additional storage components into the system (e.g. flywheels and ultra capacitors) by adding their corresponding power terms to the right hand sides of (9) and (10). The term $u_b$ represents the absolute value of the change in successive horizon time-step battery power rates. The term is used to smooth the battery power profile signal.

In (8c) the grid signal shaping cost/penalty terms are shown. The term $c_{smg}^T u_g$ smooths the grid signal by minimizing successive differences in the power grid signal $p_g = p_s^{cs} + p_s^{cb} - p_s^{db} - p_s^{ds} + p_d$. The middle term $c_{peak} p_g^{ob}$ represents incremental peak usage costs above baseline $p_g^{base}$ to enable peak shaving. The last term in (8c) enables flattening or squeezing of the grid signal $p_g$.

The above has a number of state decision constraints that need to be taken into account. The optimization in the rolling horizon controller makes decisions whether to either charge or discharge the battery storage device, to enforce this exclusive behaviour the following constraints are used on the battery power rate variables:

$$0 \leq p_{bat}^{gc} \leq p_{bat}^{gc,max} \delta_{cd} \quad (11)$$

$$0 \leq p_{bat}^{rc} \leq p_{bat}^{rc,max} \delta_{cd} \quad (12)$$

$$0 \leq p_{bat}^{gd} \leq p_{bat}^{gd,max}(1 - \delta_{cd}) \quad (13)$$

$$0 \leq p_{bat}^{rd} \leq p_{bat}^{rd,max}(1 - \delta_{cd}) \quad (14)$$

$$0 \leq \delta_{cd} \leq 1 \quad (15)$$

where $\delta_{cd}$ is a binary vector such that for the $k^{th}$ element $\delta_{cd_k} = 1$ indicates charging and indicates charging. The scalar constants $p_{bat}^{gc,max}$, $p_{bat}^{gd,max}$ represent maximum green zone charging/discharging power rates, while $p_{bat}^{rc,max}$ and $p_{bat}^{rd,max}$ represent maximum incremental red zone charging/discharging power rates.

The controller also decides whether the micro grid draws power from the outside grid (buying state), or power flows from the local micro grid to the outside grid (selling state). The following constraints affect the magnitude of battery charging/discharging power rates that relate to buying/selling state decisions:

$$P_s^{db,max}(1 - \delta_{bs2}) \leq p_s^{db} \leq P_s^{db,max} 1 \quad (16)$$

$$0 \leq p_s^{ds} \leq (p_{bat}^{gd,max} + p_{bat}^{rd,max})(1 - \delta_{bs2}) \quad (17)$$

$$P_s^{cs,max} \delta_{bs1} \leq p_s^{cs} \leq P_s^{cs,max} 1, \quad (18)$$

$$0 \leq p_s^{cb} \leq (p_{bat}^{gc,max} + p_{bat}^{rc,max}) \delta_{bs1} \quad (19)$$

where $0 \leq \delta_{bsi} \leq 1, i = 1, 2$ \quad (20)

$$P_{s_{k,k}}^{db,max} = \min(\max(0, p_{d_k}), P_{bat}^{gd,max} P_{bat}^{rd,max}) \quad (21)$$

$$P_{s_{k,k}}^{cs,max} = \min(\max(0, -p_{d_k}), P_{bat}^{pc,max} + P_{bat}^{rd,max}) \quad (22)$$

for $k \in [1, N_h]$.

The binary vectors $\delta_{bs1}$ and $\delta_{bs2}$ are used to make buy/sell state decisions. The truth table in Table I below indicates the different possible scenarios. The constraints in (16)-(19) are designed such that power rates $p_s^{db}$ and $p_s^{cs}$ are utilized first for discharging and charging respectively; also note that their maximums, given in (21) and (22), are depend on net demand $p_d$.

TABLE I

GRID FLOW DECISIONS - NET DEMAND KNOWN

| $\delta_{cd_k}$ | $\delta_{bs1_k}$ | $\delta_{bs2_k}$ | $p_{d_k} > 0$ | $p_{d_k} < 0$ |
|---|---|---|---|---|
| 0 | 0 | 0 | sell* | sell |
| 0 | 0 | 1 | buy | sell+ |
| 0 | 1 | 0 | sell* | infeasible |
| 0 | 1 | 1 | buy | infeasible |
| 1 | 0 | 0 | infeasible | sell |
| 1 | 0 | 1 | buy+ | sell |
| 1 | 1 | 0 | infeasible | buy* |
| 1 | 1 | 1 | buy | buy* |

*may not be possible due to storage power limits
+indicates storage power activity is zero It should be noted that there are also battery energy and power rate change constraints that need to be accounted for. To enforce that at each time-step in the horizon battery energy levels remain within certain bounds, given battery model (1), one employs $$E_{bat}^{min} \leq \eta_c \Sigma_{i=1}^k h_i(p_{bat_i}^{gc} + p_{bat_i}^{rc}) - E_{bat}^{loss} \Sigma_{i=1}^k h_i - \eta_d^{-1} \Sigma_{i=1}^k h_i(p_{bat_i}^{gd} + p_{bat_i}^{rd}) + E_{bat}^{t^o} \leq E_{bat}^{max}, k \in [1, N_h] \quad (23)$$

where $E_{bat}^o$ is the energy level at the start of the horizon, and $E_{bat}^{min}$ and $E_{bat}^{max}$ are lower and upper bounds, respectively.

The end of horizon battery energy level can be set via $$\eta_c h^T(p_{bat}^{gc}+p_{bat}^{rc})-\eta_d^{-1}h^T(p_{bat}^{gd}+p_{bat}^{rd})-E_{bat}^{loss}h^T1=E_{bat}^{final}-E_{bat}^o \quad (24)$$

where $E_{bat}^{final}$ is the desired end of horizon battery energy level.

Constraints related to battery signal smoothing and power rate change limits are represented by $$-\Delta p_{bat}h \leq -u_{b_k} \leq p_{bat_k}^{gc}+p_{bat_k}^{rc}-p_{bat_k}^{gd}-p_{bat_k}^{rd}-p_{bat_{k-1}}^{gc}-p_{bat_{k-1}}^{rc}+p_{bat_{k-1}}^{gd}+p_{bat_{k-1}}^{rd} \leq u_{b_k} \leq \Delta p_{bat}h \quad (25)$$

for $k \in [1, N_h]$ and $u_b \geq 0$. The term $\delta_{p_{bat}}$ represents the maximum allowed battery power rate change typically given in units of kW/h. Note that when k=1 battery activity from the previous iteration of the rolling horizon controller is needed and are treated as constants in the inequality constraints. Also note that this constraint can be rewritten with different variables by using equality constraints (9) and (10).

Further constraints for battery red-zone power rate must also be accounted for. The optimization can decide when to enable/disable battery red zone incremental power rates by using the following $$0 \leq p_{bat}^{rc} \leq p_{bat}^{rc,max}\delta_r \quad (26)$$

$$0 \leq p_{bat}^{rd} \leq p_{bat}^{rd,max}\delta_r \quad (27)$$

$$0 \leq \delta_r \leq 1 \quad (28)$$

where the elements of binary vector $\delta_r$ indicate when incremental red-zone power rates are active. To ensure green-zone power rates are first used, the following constraints are needed:

$$p_{bat}^{gc,max}\delta_r - p_{bat}^{gc,max}(1-\delta_{cd}) \leq p_{bat}^{gc} \quad (29)$$

$$p_{bat}^{gc,max}\delta_r - p_{bat}^{gd,max}\delta_{cd} \leq p_{bat}^{gd} \quad (30)$$

It is assumed the red-zone power rates can be active for a limited amount of time and thus have a maximum on-time denoted by $T^{maxon}$. Moreover it is also assumed that a minimum cool down like time period is required before the red-zone power rates can be reactivated, this minimum off-time is denoted by $T^{minoff}$. The maximum on-time and minimum off-time constraints considering variable time steps in the horizon are formulated as $$\sum_{k=j}^{j+T_j^{maxon}} h_k \delta_{rk} \leq T^{maxon}, \forall j \in [j_{min}, j_{max}] \quad (31a)$$

$$j_{min} = 2 - \min_{h_1 > T^{maxon}} l \in \mathbb{Z} \quad (31b)$$

$$j_{max} = \max_{\sum_{k=\gamma}^{N_h} h_k > T^{maxon}} \gamma \in \mathbb{Z} \quad (31c)$$

$$T_j^{maxon} = \min_{\sum_{k=j}^{j+\tau} h_k > T^{maxon}} \tau \in \mathbb{Z} \quad (31d)$$

$$\delta_{r_{j-k-1}} - \delta_{r_{j-k}} \leq 1 - \delta_{r_j}, \forall k \in [1, T_j^{minoff}-1] \quad (32a)$$

$$\forall j \in \{[1, N_h] | T_j^{minoff} \geq 2\} \quad (32b)$$

$$T_j^{minoff} = \min_{\sum_{k=j-\tau}^{j-1} h_k \geq T^{minoff}} \tau \in \mathbb{Z}, \tau \geq 1 \quad (32c)$$

where the first element $h_k = h_1$ is used when $k \leq 0$. Note that a history of previous red-zone activity is needed, the time length of which is dictated by $T^{maxon}$ and $T^{minoff}$. These past binary values are treated as constants in the inequality constraints. The maximum on-time constraints are given in (31). These constraints function by scanning rolling windows of time length just greater than $T^{maxon}$. In (32) the minimum off-time constraints are shown, they operate by scanning sufficiently back such that the last time red-zone activity was disabled does not occur within the last $T^{minoff}$ hours. The terms in (31b)-(31d) and (32c) are used to find the correct range of integer indices in the variable time-step horizon; they can be pre-computed by using only h, $T^{maxon}$, and $T^{minoff}$. Note that in (32b), only indices which satisfy $T_j^{minoff} \leq 2$ are included. An example highlighting how the red-zone constraints function is illustrated in FIG. 9B. FIG. 9B shows battery red zone power rates maximum-on-time/minimum-off-time constraints that show an allowable $\delta_r$. The dashed boxes show the scanning windows for the maximum on-time constraints. The dashed arrows correspond to the minimum off-time constraints.

Other constraints, dealing with grid signal shaping, also have to be accounted for. The signal corresponding to connection of the local micro grid to the external grid can be shaped if desired in the AC-EMS controller. To enable peak shaving and reduction over some baseline the following inequality is employed:

$$p_{bat}^{gc}+p_{bat}^{rc}-p_{bat}^{gd}-p_{bat}^{rd}+p_d \leq p_g^{base}1+p_g^{ob}1 \quad (33)$$

where $p_g^{ob} \geq 0$.

Grid signal flattening or squeezing requires the inequalities $$p_g^{min}1 \leq p_s^{cs}+p_s^{cb}-p_s^{db}-p_s^{ds}+p_d \leq p_g^{max}1 \quad (34)$$

where $p_g^{min}$ and $p_g^{max}$ are scalar optimization variables corresponding to minimum and maximum grid power rates.

Grid signal smoothing of successive grid power rate changes needs inequalities $$-u_{g_k} \leq p_{s_k}^{cs}+p_{s_k}^{cb}-p_{s_k}^{db}-p_{s_k}^{ds}+p_{d_k}-p_{d_{k-1}}-p_{s_{k-1}}^{cs}-p_{s_{k-1}}^{cb}+p_{s_{k-1}}^{db}+p_{s_{k-1}}^{ds} \leq u_{g_k} \quad (35)$$

for $k \in [1, N_h]$ and $u_g \geq 0$. When k=1, past grid power activity and net demand from the previous time-step or iteration of the rolling horizon controller is needed. Note that (33)-(35) can be rewritten in terms of other variables by employing (9) and (10).

It is possible to replace the vectors $p_s^{cs}$, $p_s^{cb}$, $p_s^{db}$, and $p_s^{ds}$ with separate variables that directly correspond to the amount of power bought/sold to the grid, i.e. modify (8a) to $$\min(c_{buy}^T p_g^b - c_{sell}^T p_g^s) \quad (36)$$

where $p_g^b$ is the power bought from the external grid and $p_g^s$ is the power sold to the grid. The following additional power balance equality constraint is needed $$p_g^b - p_g^s - p_{bat}^{gc} - p_{bat}^{rc} + p_{bat}^{gd} + p_{bat}^{rd} = p_d \quad (37)$$

Additional constraints to ensure $(p_g^b)^T p_g^s = 0$ would also be needed; it is possible to achieve this by using a single binary vector to indicate buying/selling states. While this approach may appear simpler in the non-robust case where vector $p_d$ is known, making this formulation more robust is problematic since an uncertain vector in an equality constraint appears, i.e. $p_d$ in (37). The inventors are currently unaware of any robust optimization approaches where one can convert uncertain equality constraints into equivalent robust counterparts. One may be tempted to perform substitutions using (37), however this approach tends to yield inequality constraints that when made more robust are rendered infeasible. While the formulation presented above avoids these drawbacks, the robust MILP formulation of it is discussed below.

For clearer understanding of the robust MILP formulation, some necessary theory related to robust counterpart optimization is first provided below. In particular, it will be shown how to convert an inequality constraint with uncertainties into a robust counterpart form while retaining linearity. Once this has been covered, a MILP optimization formulation that is robust to a predicted and uncertain net demand vector will be presented.

For the robust counterpart constraints, once can first consider the following inequality constraint $$a^T x \leq b \tag{38}$$

where a is an uncertain left-hand-side coefficient vector and b is an uncertain right-hand-side parameter. The uncertainties can be modelled as nominal values plus bounded error terms and written as $$\bar{a}^T x + \sum_j \xi_j \Delta \bar{a}_j x_j \leq \bar{b} + \zeta \Delta \bar{b} \tag{39}$$

where $\bar{a}$ and $\bar{b}$ are nominal values, $\Delta \bar{a} \geq 0$ and $\Delta \bar{b} \geq 0$ are maximum bounds on the errors. The vector $\xi$ and parameter $\zeta$ represent the uncertainty set. Using an interval (box) uncertainty set results in $$\|\xi\|_\infty \leq 1, |\zeta| \leq 1 \tag{40}$$

the use of a polyhedral uncertainty set, also known as a budgeted uncertainty, for the unknown coefficients impose the condition $$\|\xi\|_1 \leq \Gamma \tag{41}.$$

Figure 9C:
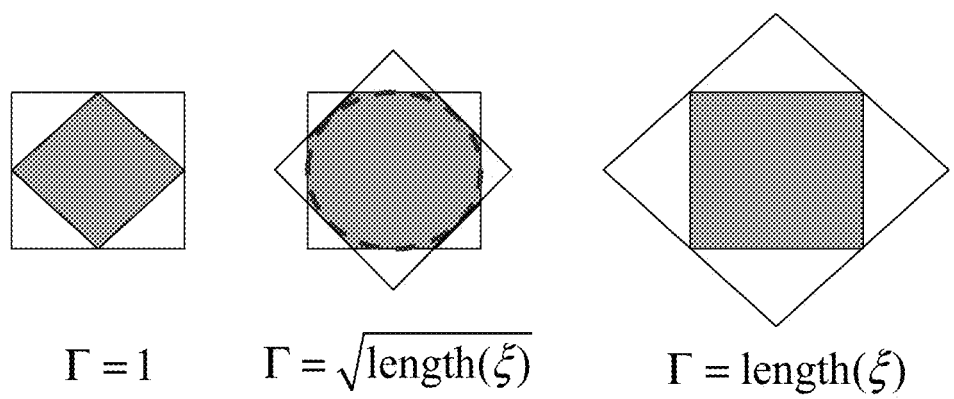
FIG. 9C illustrates the intersection of the interval and polyhedral uncertainty set.

The intersection of the interval+polyhedral uncertainty set is illustrated in FIG. 9C and shows that choosing $1 < \Gamma <$ length( ) is desired. In FIG. 9C, the middle diagram shows the case that best approximates a circular ($L_2$-norm) set.

A robust counterpart constraint to (39) that aims to yield a robustly feasible solution is given by $$\bar{a}^T x + \max_\xi \{\sum_j \xi_j \Delta \bar{a}_j x_j\} - \min_\zeta \{\zeta \Delta \bar{b}\} \leq \bar{b} \tag{42}.$$

Considering uncertainty sets (40) and (41), the above is equivalent to the following set of constraints $$\bar{a}^T x + \sum_j w_j + \Gamma z + \Delta \bar{b} \leq \bar{b} \tag{43}$$

$$\Delta \bar{a}_j |x_j| \leq z + w_j \tag{44}$$

$$z \geq 0, w \geq 0 \tag{45}.$$

When considering the robust counterpart optimization, uncertainties are assumed to appear in the net demand prediction vector $p_d$. This vector is assumed to have bounded errors and satisfies $$\bar{p}_d - \Delta \bar{p}_d = p_d^{min} \leq p_d \leq p_d^{max} = \bar{p}_d + \Delta \bar{p}_d \tag{46}$$

where vector $\bar{p}_d$ denotes an estimate of net demand with bounded error vector $\Delta \bar{p}_d$.

Figure 10:
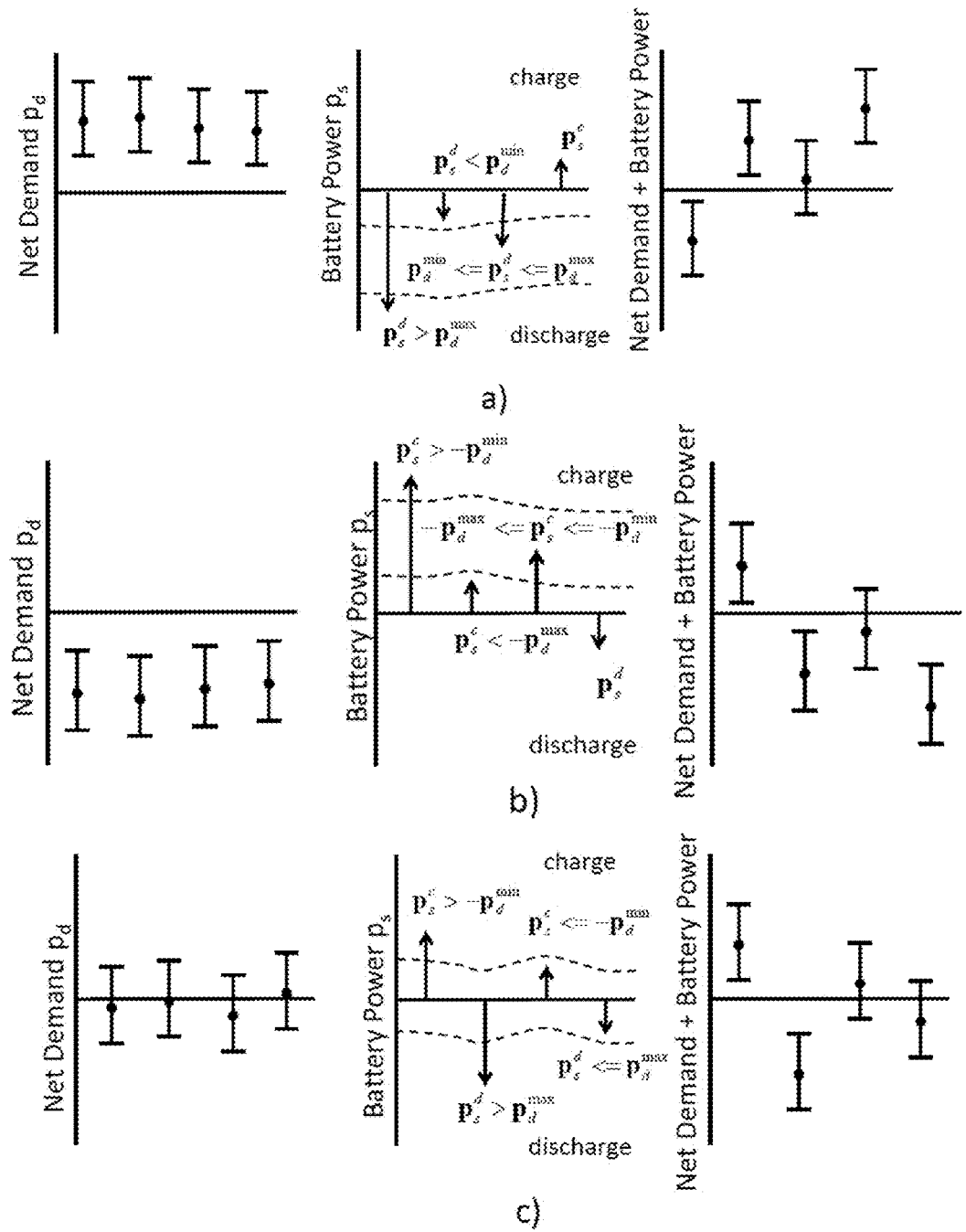
FIG. 10 show buy/uncertain/sell states for different net demand cases.

The non-robust optimization given above was able to make hard decisions regarding buy/selling to the grid since it assumed that the net demand vector was known. In the robust case, this is not always possible since a bounded uncertainty in the net demand prediction vector creates an additional uncertain buying/selling state as depicted in FIG. 10 for different cases of net demand. For clarity it should be noted that for FIG. 10a, the net demand is positive, for FIG. 10b, the net demand is negative, and for FIG. 10c, the net demand is uncertain.

The magnitude of charging/discharge battery storage can lead to three possible states: buying/uncertain/selling. As a result the power balance equality constraints (9) and (10) are replaced with $$p_s^{cs} + p_s^{cu} + p_s^{cb} = p_{bat}^{gc} + p_{bat}^{rc} \tag{47}$$

$$p_s^{db} + p_s^{du} + p_s^{ds} = p_{bat}^{gd} + p_{bat}^{rd} \tag{48}$$

where the additional terms $p_s^{cu}$ and $p_s^{du}$ represent the portion of storage power corresponding to the uncertain state for charging and discharging, respectively. For example, the first and third blue down arrows in FIG. 10a) and the blue down arrows in FIG. 10c) all have a non-zero $p_s^{du}$. In FIG. 10a) and FIG. 10c) the first and third blue arrows all have non-zero $p_s^{cu}$. With the addition of these two extra power vectors, (8a) must be modified to $$\min(c_{sell}^T p_s^{cs} + c_{bs,c}^T p_s^{cu} + c_{buy}^T p_s^{cb} - c_{buy}^T p_s^{db} - c_{bs,d}^T p_s^{du} - c_{sell}^T p_s^{ds}) \tag{49}$$

where $c_{bs}$, $c_{bs,c}$ and $c_{bs,d}$ are uncertain cost coefficient vectors that depend on $p_d$. These vectors have values that lie in the range $[\min(c_{buy}, c_{sell}), \max(c_{buy}, c_{sell})]$. Although the term $c_{bs}^T p_d$ is uncertain, it is not altered by the optimization routine, therefore as in the non-robust case it can be neglected to obtain the same control action. The other cost terms in (8b) and (8c) remain unchanged.

The two remaining uncertain cost vectors have estimates and bounded errors given by $$\bar{c}_{bs,\gamma} = \frac{c_{buy} + c_{sell}}{2}, \Delta \bar{c}_{bs,\gamma} = \frac{|c_{buy} - c_{sell}|}{2} \tag{50}$$

where $\gamma = c$ or $d$.

Using (8b), (8c), (49) with estimates/bounds in (50) and robust counterpart in (43), the minimum robust worst case cost of (8) becomes $$\min t \tag{51}$$

$$c_{sell}^T p_s^{cs} + \left(\frac{c_{buy} + c_{sell}}{2}\right)^T p_s^{cu} + c_{buy}^T p_s^{cb} - \tag{52a}$$

$$c_{buy}^T p_s^{db} - \left(\frac{c_{buy} + c_{sell}}{2}\right)^T p_s^{du} - c_{sell}^T p_s^{ds} + \tag{52b}$$

$$c_{bat}^T (p_{bat}^{gc} + p_{bat}^{rc} + p_{bat}^{gd} + p_{bat}^{rd}) + c_{smb}^T u_b + \tag{52c}$$

$$c_{smg}^T u_g + c_{peak} p_g^{ob} + c_{flat} (p_g^{max} - p_g^{min}) + \tag{52d}$$

$$\Gamma z_c + \Gamma z_d + 1^T w_c + 1^T w_d \leq t \tag{52e}$$

where $t$, $z_c$, $z_d$, $w_c$ and $w_d$ are auxiliary variables for the robust worst case optimization. The following extra robust counterpart constraints based on (44) and (45) are also needed $$\left(\frac{|c_{buy_j} + c_{sell_j}|}{2}\right) p_{sj}^{cu} \leq z_c + w_{c_j}, j \in [1, N_h] \tag{53}$$

$$\left(\frac{|c_{buy_j} + c_{sell_j}|}{2}\right) p_{sj}^{du} \leq z_d + w_{d_j}, j \in [1, N_h] \tag{54}$$

$$0 \leq z_c, 0 \leq z_d, 0 \leq w_c, 0 \leq w_d. \tag{55}$$

The robust optimization makes decisions whether to charge/discharge the battery, therefore it also uses constraints (11)-(15). However, grid flow conditions now become one of buying state, uncertain state, or selling state. To enable this, in addition to (16)-(20), the following extra buy/uncertain/sell state decision constraints are needed:

$$P_s^{db,max}(1-\delta_{bs1}) \leq p_s^{db} \tag{56}$$

$$P_s^{du,max}(1-\delta_{bs2}) \leq p_s^{du} \leq P_s^{db,max}(1-\delta_{bs1}) \tag{57}$$

$$P_s^{cs,max}\delta_{bs2} \leq p_s^{cs} \tag{58}$$

$$P_s^{cu,max}\delta_{bs1} \leq p_s^{cu} \leq P_s^{cu,max}\delta_{bs2} \tag{59}$$

where $$P_{s_{k,k}}^{du,max} = \min(p_{bat}^{gd,max} + p_{bat}^{rd,max}, \max(0, \bar{p}_{d_k} + \Delta \bar{p}_{d_k}) - \max(0, \bar{p}_{d_k} - \Delta \bar{p}_{d_k})) \tag{60}$$

$$P_{s_{k,k}}^{cu,max} = \min(p_{bat}^{gc,max} + p_{bat}^{gc,max} + p_{bat}^{rc,max}, \min(0, \bar{p}_{d_k}) - \min(0, \bar{p}_{d_k} - \Delta \bar{p}_{d_k})) \tag{61}$$

and (21) and (22) are replaced with $$P_{s_{k,k}}^{db,max} = \min(\max(0, \bar{p}_{d_k} - \Delta \bar{p}_{d_k}), p_{bat}^{gd,max} + p_{bat}^{rd,max}) \tag{62}$$

$$P_{s_{k,k}}^{cs,max} = \min(\max(0, \bar{p}_{d_k} - \Delta \bar{p}_{d_k}), p_{bat}^{gc,max} + p_{bat}^{rc,max}) \tag{63}$$

for $k \in [1, N_h]$. The truth table for the different grid-flow states under different net demand conditions in shown in Table II below.

TABLE II

GRID FLOW DECISIONS - NET DEMAND UNKNOWN

| $\delta_{cd_k}$ | $\delta_{bs1_k}$ | $\delta_{bs2_k}$ | $0 < p_{d_k}^{min} < p_{d_k}^{max}$ | $p_{d_k}^{min} < p_{d_k}^{max} < 0$ | $p_{d_k}^{min} < 0 < p_{d_k}^{max}$ |
|---|---|---|---|---|---|
| 0 | 0 | 0 | sell* | sell | sell* |
| 0 | 0 | 1 | uncertain* | infeasible | uncertain |
| 0 | 1 | 0 | infeasible | infeasible | infeasible |
| 0 | 1 | 1 | buy | infeasible | infeasible |
| 1 | 0 | 0 | infeasible | sell | infeasible |
| 1 | 0 | 1 | infeasible | uncertain* | uncertain |
| 1 | 1 | 0 | infeasible | infeasible | infeasible |
| 1 | 1 | 1 | buy | buy* | buy* |

*may not be possible due to storage power limits

The battery energy, power rate and red zone constraints in (23)-(32) are unchanged. The peak demand over some baseline constraint (33) becomes $$p_{bat}^{gc} + p_{bat}^{rc} - p_{bat}^{gd} - p_{bat}^{rd} + \bar{p}_d + \Delta \bar{p}_d \leq p_g^{base} 1 + p_g^{ob} 1 \tag{64}$$

where $p_g^{ob} \geq 0$. The grid signal flattening constraint (34) is replaced with robust constraints $$p_s^{cs} + p_s^{cu} + p_s^{cb} - p_s^{db} - p_s^{du} - p_s^{ds} + \bar{p}_d + \Delta \bar{p}_d \leq p_g^{base} 1 \tag{65}$$

$$p_g^{min} 1 \leq p_s^{cs} + p_s^{cu} + p_s^{cb} - p_s^{db} - p_s^{du} - p_s^{ds} + \bar{p}_d + \Delta \bar{p}_d \tag{66}$$

The grid signal smoothing constraint (35) is replaced with robust counterparts $$p_{s_k}^{cs} + p_{s_k}^{cu} + p_{s_k}^{cb} - p_{s_k}^{db} - p_{s_k}^{du} - p_{s_k}^{ds} + \bar{p}_{d_k} + \Delta \bar{p}_{d_k} - p_{s_{k-1}}^{cs} - p_{s_{k-1}}^{cu} - p_{s_{k-1}}^{cb} + p_{s_{k-1}}^{db} + p_{s_{k-1}}^{du} + p_{s_{k-1}}^{ds} - \bar{p}_{d_{k-1}} + \Delta \bar{p}_{d_{k-1}} \leq u_{g_k} \tag{67}$$

$$-p_{s_k}^{cs} - p_{s_k}^{cu} - p_{s_k}^{cb} + p_{s_k}^{db} + p_{s_k}^{du} + p_{s_k}^{ds} - \bar{p}_{d_k} + \Delta \bar{p}_{d_k} + \bar{p}_{d_{k-1}} + p_{s_{k-1}}^{cs} + p_{s_{k-1}}^{cu} + p_{s_{k-1}}^{cb} - p_{s_{k-1}}^{db} - p_{s_{k-1}}^{du} - p_{s_{k-1}}^{ds} + \bar{p}_{k-1} + \Delta \bar{p}_{d_{k-1}} \leq u_{g_k} \tag{68}$$

for $k \in [1, N_h]$ and $u_g \geq 0$.

For ease of reference for the above description, the following glossary of terms and notation is provided.

GLOSSARY OF TERMS AND NOMENCLATURE

A. Constants $N_h \in \mathbb{Z}$ number of time steps in horizon
$h \in \mathfrak{R}^{N_h}$ vector of time step lengths in hours
$E_{bat}^{min} \in \mathfrak{R}$ minimum battery energy level
$E_{bat}^{max} \in \mathfrak{R}$ maximum battery energy level
$E_{bat}^{loss} \in \mathfrak{R}$ battery self-discharge loss
$\eta_c \in \mathfrak{R}$ battery charging efficiency
$\eta_d \in \mathfrak{R}$ battery discharging efficiency
$p_{bat}^{gc,max} \in \mathfrak{R}$ max battery green zone charging rate
$p_{bat}^{rc,max} \in \mathfrak{R}$ max red zone incremental charging rate
$p_{bat}^{gd,max} \in \mathfrak{R}$ max battery green zone discharging rate
$p_{bat}^{rd,max} \in \mathfrak{R}$ max red zone incremental discharging rate
$\Delta p_{bat} \in \mathfrak{R}$ max change in battery power rate
$T^{maxon} \in \mathfrak{R}$ zone maximum on-time in hours
$T^{minoff} \in \mathfrak{R}$ red zone minimum off-time in hours
$\Gamma \in \mathfrak{R}$ polyhedral set size robustness parameter

B. Rolling Horizon Control Variables $c_{buy} \in \mathfrak{R}^{N_h}$ electricity usage buying cost
$c_{sell} \in \mathfrak{R}^{N_h}$ electricity selling price
$c_{peak} \in \mathfrak{R}$ peak electricity demand usage cost
$c_{bat} \in \mathfrak{R}^{N_h}$ battery usage cost
$c_{smb} \in \mathfrak{R}^{N_h}$ battery signal smoothing penalty
$c_{smg} \in \mathfrak{R}^{N_h}$ grid signal smoothing penalty
$c_{flat} \in \mathfrak{R}$ grid signal flattening penalty
$E_{bat}^o \in \mathfrak{R}$ actual battery energy at start of horizon
$E_{bat}^{final} \in \mathfrak{R}$ desired battery energy at end of horizon
$p_g^{base} \in \mathfrak{R}$ baseline for demand charges in horizon
$\bar{p}_d \in \mathfrak{R}^{N_h}$ estimate of predicted net demand
$\Delta \bar{p}_d \in \mathfrak{R}^{N_s}$ error estimate of predicted net demand
$P_s^{db,max} \in \mathfrak{R}^{N_h \times N_h}$ diagonal matrix of upper bounds
$P_s^{du,max} \in \mathfrak{R}^{N_h \times N_h}$ diagonal matrix of upper bounds
$P_s^{cs,max} \in \mathfrak{R}^{N_h \times N_h}$ diagonal matrix of upper bounds
$P_s^{cu,max} \in \mathfrak{R}^{N_h \times N_h}$ diagonal matrix of upper bounds

C. Optimization Variables $p_s^{cs} \in \mathfrak{R}^{N_h}$ storage charging rate (offset selling portion)
$p_s^{cu} \in \mathfrak{R}^{N_h}$ storage charging rate (uncertain portion)
$p_s^{cb} \in \mathfrak{R}^{N_h}$ storage charging rate (grid buying portion)
$p_s^{db} \in \mathfrak{R}^{N_h}$ storage discharging rate (offset buying portion)
$p_s^{du} \in \mathfrak{R}^{N_h}$ storage discharging rate (uncertain portion)
$p_s^{ds} \in \mathfrak{R}^{N_h}$ storage discharging rate (grid selling portion)
$p_{bat}^{gc} \in \mathfrak{R}^{N_h}$ green zone battery charging power rate
$p_{bat}^{rc} \in \mathfrak{R}^{N_h}$ incremental red zone battery charging power rate
$p_{bat}^{gd} \in \mathfrak{R}^{N_h}$ green zone battery discharging power rate
$p_{bat}^{rd} \in \mathfrak{R}^{N_h}$ incremental red zone battery discharging rate
$u_g \in \mathfrak{R}^{N_h}$ auxiliary vector for grid signal smoothing
$u_b \in \mathfrak{R}^{N_h}$ auxiliary vector for battery signal smoothing
$p_g^{ob} \in \mathfrak{R}$ maximum net power demand over some baseline
$p_g^{max} \in \mathfrak{R}$ maximum net power demand
$p_g^{min} \in \mathfrak{R}$ minimum net power demand
$\delta_{bs1} \in \mathbb{Z}^{N_h}$ binary vector for buying/uncertain/selling states
$\delta_{bs2} \in \mathbb{Z}^{N_h}$ binary vector for buying/uncertain/selling states
$\delta_{cd} \in \mathbb{Z}^{N_h}$ binary vector for battery charging/discharging
$\delta_r \in \mathbb{Z}^{N_h}$ binary vector for battery red-zone rate usage
$t \in \mathfrak{R}$ auxiliary variable used to minimize worst case $z_c \in \mathfrak{R}$ robust counterpart auxiliary variable
$z_d \in \mathfrak{R}$ robust counterpart auxiliary variable
$w_c \in \mathfrak{R}^{N_h}$ robust counterpart auxiliary vector
$w_d \in \mathfrak{R}^{N_s}$ robust counterpart auxiliary vector It should be noted that the present invention has multiple aspects and the above description is only exemplary and should not be taken as limiting the ambit of the invention. One aspect of the invention can be seen as a system and method for controlling power flow of different storage elements including a battery, an ultracapacitor, a flywheel, a PHEV, an EV, or any other energy storage mean. Similarly, another aspect of the invention can be considered to be a system and method for using and predicting power from renewable energy sources such as wind, solar, geothermal, etc. A further aspect of the invention may be seen to be a control process using any external information and user settings including Internet, smartphone, weather, location, occupancy, PHEV/EV connected, controllable loads connected, etc. Yet another aspect of the invention is that of a control process using on-the-fly and adaptive optimization based control to optimally and robustly to decide buying/selling from grid, utilization of controllable loads, utilization and contribution from each storage element, maximization of lifetime of components, and overall optimal economic usage of system.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language For example, preferred embodiments may be implemented in a procedural programming language (e.g. "C") or an object oriented language (e.g. "C++", "java", or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A system for controlling power flow to a facility, the system comprising:
    a controller for controlling said power flow to said facility and for controlling elements of said system;
    a power bus for coupling elements of said system to said controller and to one another;
    at least one energy storage unit element for storing energy, said at least one energy storage unit element being coupled to said power bus;
    at least one renewable energy source for generating power, said at least one renewable energy source being coupled to said power bus;
    at least one power load located at said facility, said at least one power load being controlled by said controller;
wherein
    said controller controls said power flow to said facility based on at least one of:
        geographical data;
        occupancy data;
        historical data for power consumption of said facility;
        operating conditions of said system;
        predicted power demands of said system; and
        user entered preferences;
    said controller predicts an electricity demand of said facility for a succeeding fixed and predetermined future time period based on historical data for power consumption of said facility;
    said controller predicts a renewable energy production capacity of said at least one renewable energy source;
    said controller determines a net demand for power by said facility based on a predicted electricity demand and on a predicted renewable energy production capacity;
    said controller determines whether to draw power from an external power grid based on said net demand for power;
    said controller, when necessary, configures said power flow to said facility to an islanded mode wherein, when in islanded mode, said facility is disconnected from said external power grid and said facility only uses power from said at least one renewable energy source and from said at least one energy storage unit element;
    said controller optimizes power decisions for said facility using a Mixed Integer Linear Programming formulation using optimization costs which include buying/selling electricity, peak demand, battery usage, battery power signal smoothing, grid connection signal smoothing, and grid connection signal flattening.

2. A system according to claim 1 wherein said system couples to a power grid through said power bus, access to said power grid by said system being controlled by said controller.

3. A system according to claim 2 wherein said controller controls said power flow to said facility based on an optimization process, said optimization process being for optimizing said power flow relative to at least one of:
a cost of power received from said power grid;
an amount of power consumed;
an amount of power generated by said at least one power source element;
an amount of power stored by at least one energy storage unit element;
an amount of power retrieved from said at least one energy storage unit element; and
a user defined provided constraint.

4. A system according to claim 1 wherein said at least one energy storage unit element is at least one of:
a battery;
a capacitor;
an ultra capacitor;
a flywheel;
an electric vehicle equipped with an on-board battery.

5. A system according to claim 1 wherein said at least one renewable energy source is at least one of:
solar power panels;
wind-power turbines.

6. A system according to claim 1 wherein said system further comprises a communications bus, said communications bus being for transmitting communications between said elements and said controller.

7. A system according to claim 3 wherein said optimization process calculates said power flow using at least one of:
weather data;
geographical data;
occupancy data;
historical data for power consumption of said facility;
operating conditions of said system; and
predicted power demands of said system.

8. A system according to claim 1 wherein said at least one renewable energy source is a device which uses at least one of:
hydro-electricity;
biomass technology;
geothermal energy.

9. A method for optimizing operations at a system which controls power flow to a facility, the method comprising:
a) gathering power usage data by said system over a predetermined period of time immediately preceding a set point in time;
b) predicting power usage by said system for a predetermined future period of time based on said power usage data, said predetermined future period of time being immediately succeeding said set point in time;
c) predicting an amount of power generated by renewable energy sources in said system for said predetermined future period of time;
d) determining a net demand for power for said system based on said power usage predicted in step b) and said amount of power predicted in step c);
e) determining whether to draw power from energy storage unit elements in said system for said future period of time based on said net demand for power for said system;
f) determining whether to draw power from an external power grid for said future period of time based on said net demand for power for said system, said external power grid being coupled to said system;
wherein, when necessary, said facility is disconnected from said external power grid and said facility only uses power generated from said renewable energy sources and power stored in said energy storage unit elements;
wherein power decisions for said facility are optimized using a Mixed Integer Linear Programming formulation using optimization costs which include buying/selling electricity, peak demand, battery usage, battery power signal smoothing, grid connection signal smoothing, and grid connection signal flattening.

10. A method according to claim 9 wherein said step of determining whether to draw power from said external power grid is further based on a buying cost of power from said external power grid.

11. A method according to claim 9 further including a step of determining whether to sell power from said system to said external power grid based on a selling cost of power for said external power grid.

12. A method according to claim 9 wherein said renewable energy sources comprises solar cells and said step of predicting an amount of power generated by said renewable energy sources is based on recent weather data.

* * * * *